United States Patent
Aso

(10) Patent No.: US 11,296,397 B2
(45) Date of Patent: Apr. 5, 2022

(54) LIQUID CRYSTAL DISPLAY DEVICE INCLUDING ANTENNA COIL

(71) Applicant: SHARP KABUSHIKI KAISHA, Sakai (JP)

(72) Inventor: Kohichi Aso, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 469 days.

(21) Appl. No.: 16/430,801

(22) Filed: Jun. 4, 2019

(65) Prior Publication Data

US 2019/0372196 A1     Dec. 5, 2019

Related U.S. Application Data

(60) Provisional application No. 62/680,078, filed on Jun. 4, 2018.

(51) Int. Cl.
| | |
|---|---|
| *H01Q 1/00* | (2006.01) |
| *H01Q 1/22* | (2006.01) |
| *G02F 1/1333* | (2006.01) |
| *H01Q 7/00* | (2006.01) |

(52) U.S. Cl.
CPC ......... *H01Q 1/22* (2013.01); *G02F 1/133308* (2013.01); *H01Q 7/00* (2013.01); *G02F 1/13332* (2021.01); *G02F 1/133314* (2021.01); *G02F 1/133317* (2021.01)

(58) Field of Classification Search
CPC ... H01Q 1/22; H01Q 7/00; H01Q 1/50; G02F 1/133308; G02F 1/133314; G02F 1/133317; G02F 1/13332; G02F 1/133334; G02F 1/1333; H04B 5/0081

USPC .......................................................... 343/720
See application file for complete search history.

(56) References Cited

U.S. PATENT DOCUMENTS

| | | | | |
|---|---|---|---|---|
| 7,760,286 | B2* | 7/2010 | Sudo ................. | G02F 1/133308 |
| | | | | 349/58 |
| 8,405,963 | B2* | 3/2013 | Liu .................... | G02F 1/133308 |
| | | | | 361/679.21 |
| 9,870,493 | B2* | 1/2018 | Yashiro .............. | G06K 7/10247 |
| 2008/0013011 | A1* | 1/2008 | Hiratsuka ......... | G02F 1/133308 |
| | | | | 349/59 |
| 2008/0192168 | A1* | 8/2008 | Sudo ................. | G02F 1/133308 |
| | | | | 349/58 |

(Continued)

FOREIGN PATENT DOCUMENTS

| | | |
|---|---|---|
| CN | 204793172 U | 11/2015 |
| JP | 2011-004076 A | 1/2011 |

(Continued)

*Primary Examiner* — Jean B Jeanglaude
(74) *Attorney, Agent, or Firm* — ScienBiziP, P.C.

(57) ABSTRACT

A liquid crystal display device including an antenna coil is provided. The device includes a liquid crystal panel; a backlight; and a bezel. The bezel includes a front bezel and a rear bezel, and houses the liquid crystal panel and the backlight using the front bezel and the rear bezel in combination. The front bezel is disposed on a liquid crystal panel side and provided with an opening superposed on a display region of the liquid crystal panel. The rear bezel is disposed on a backlight side and includes an antenna coil formed form a conductive material and an outer edge positioned outside the antenna coil in a plan view. The antenna coil is electrically insulated from the front bezel and the outer edge of the rear bezel.

5 Claims, 4 Drawing Sheets

(56) References Cited

U.S. PATENT DOCUMENTS

| | | | | |
|---|---|---|---|---|
| 2011/0120770 A1* | 5/2011 | Yokonuma | ........... | H05K 1/0215 174/94 S |
| 2011/0310545 A1* | 12/2011 | Liu | ................... | G02F 1/133308 361/679.01 |
| 2012/0268685 A1* | 10/2012 | Nishimura | ........ | G02F 1/133308 349/58 |
| 2015/0207205 A1 | 7/2015 | Kato et al. | | |
| 2018/0175482 A1 | 6/2018 | Kato et al. | | |
| 2019/0372196 A1* | 12/2019 | Aso | ...................... | H04B 5/0081 |

FOREIGN PATENT DOCUMENTS

| | | | |
|---|---|---|---|
| JP | 2014-057243 A | 3/2014 | |
| JP | 2014-212573 A | 11/2014 | |

* cited by examiner

LIQUID CRYSTAL DISPLAY DEVICE INCLUDING ANTENNA COIL

CROSS-REFERENCE TO RELATED APPLICATIONS

The present application claims priority under 35 U.S.C. § 119 to U.S. Provisional Application No. 62/680,078 filed on Jun. 4, 2018, the contents of which are incorporated herein by reference in their entirety.

BACKGROUND OF THE INVENTION

Field of the Invention

The present invention relates to liquid crystal display devices including an antenna coil.

Description of Related Art

Communication devices with a system enabling communication utilizing electromagnetic signals, such as radio frequency identification (RFID) typified by FeliCa® and near field communication (NFC) technology, have widely been used. Such RFID utilizes an electromagnetic induction system, which enables contactless transfer of energy or signals between antennas by electromagnetic induction. NFC is utilized by installing an antenna coil in a terminal such as a cellphone (e.g., JP 2014-212573 A, JP 2011-004076 A, JP 2014-057243 A).

JP 2014-212573 A discloses an interface including: a display device configured to use a matrix driving method and including a display screen on a first side of the display device; a shield plate that is disposed on a second side of the display device; and an antenna coil that is disposed between the display device and the shield plate and positioned near one end of the display device when viewed in plan from a side on which the display screen is disposed.

JP 2011-004076 A discloses a computer including a housing provided with an opening, an electronic device disposed in the housing and having a front surface exposed in the opening of the housing and a rear surface on the side opposite to the front surface, and at least one antenna consisting of a spiral type conductor. The electronic device includes a substrate and an electrode formed over the entire surface of the substrate. The antenna is positioned between the rear surface of the electronic device and the wall of the housing facing the rear surface when viewed in the thickness direction of the substrate. Part of the antenna is positioned on an outer side relative to the outer edge of the substrate in an in-plane direction of the substrate.

JP 2014-057243 A discloses a mobile terminal including a housing that houses parts of the terminal, and a display portion arranged on the front surface of the housing. The display portion includes a display module whose display surface is covered with a touch panel, an antenna for electromagnetic induction on the side facing the display surface of the display module, and a frame that integrally combines the antenna for electromagnetic induction and the display module covered with the touch panel.

BRIEF SUMMARY OF THE INVENTION

An antenna coil is installed in a terminal such as a cellphone by, for example, disposing a printed wiring board (PWB) or film having the antenna coil formed thereon in the terminal. This method utilizing parts such as a PWB or a film, however, unfortunately has disadvantages such as an increase in the number of processes and an increase in the thickness inside the terminal, and can therefore still be improved.

In response to the above issue, an object of the present invention is to provide a liquid crystal display device including an antenna coil without increasing the number of parts used.

(1) An embodiment of the present invention is directed to a liquid crystal display device including an antenna coil, the device including: a liquid crystal panel; a backlight; and a bezel, the bezel including a front bezel and a rear bezel and housing the liquid crystal panel and the backlight using the front bezel and the rear bezel in combination, the front bezel disposed on a liquid crystal panel side and provided with an opening superposed on a display region of the liquid crystal panel, the rear bezel disposed on a backlight side, the rear bezel including an antenna coil formed from a conductive material and an outer edge positioned outside the antenna coil in a plan view, the antenna coil electrically insulated from the front bezel and the outer edge of the rear bezel.

(2) In an embodiment of the present invention, the liquid crystal display device including an antenna coil includes the structure (1) and further includes a flexible circuit board on which an antenna control circuit configured to control the antenna coil is mounted, wherein the antenna coil is connected to the antenna control circuit on the flexible circuit board.

(3) In an embodiment of the present invention, the liquid crystal display device including an antenna coil includes the structure (1) or (2), and the antenna coil is bonded to a rear surface of the backlight.

(4) In an embodiment of the present invention, the liquid crystal display device including an antenna coil includes the structure (1) or (2) and further includes a magnetic sheet between the backlight and the antenna coil.

(5) In an embodiment of the present invention, the liquid crystal display device including an antenna coil includes the structure (4), and the antenna coil is bonded to a rear surface of the magnetic sheet.

The present invention can provide a liquid crystal display device including an antenna coil without increasing the number of parts used.

DETAILED DESCRIPTION OF THE INVENTION

The present invention is described in more detail based on embodiments below with reference to the drawings.

The embodiments, however, are not intended to limit the scope of the present invention. The configurations of the embodiments may appropriately be combined or modified within the spirit of the present invention.

Embodiment 1

Figure 1:
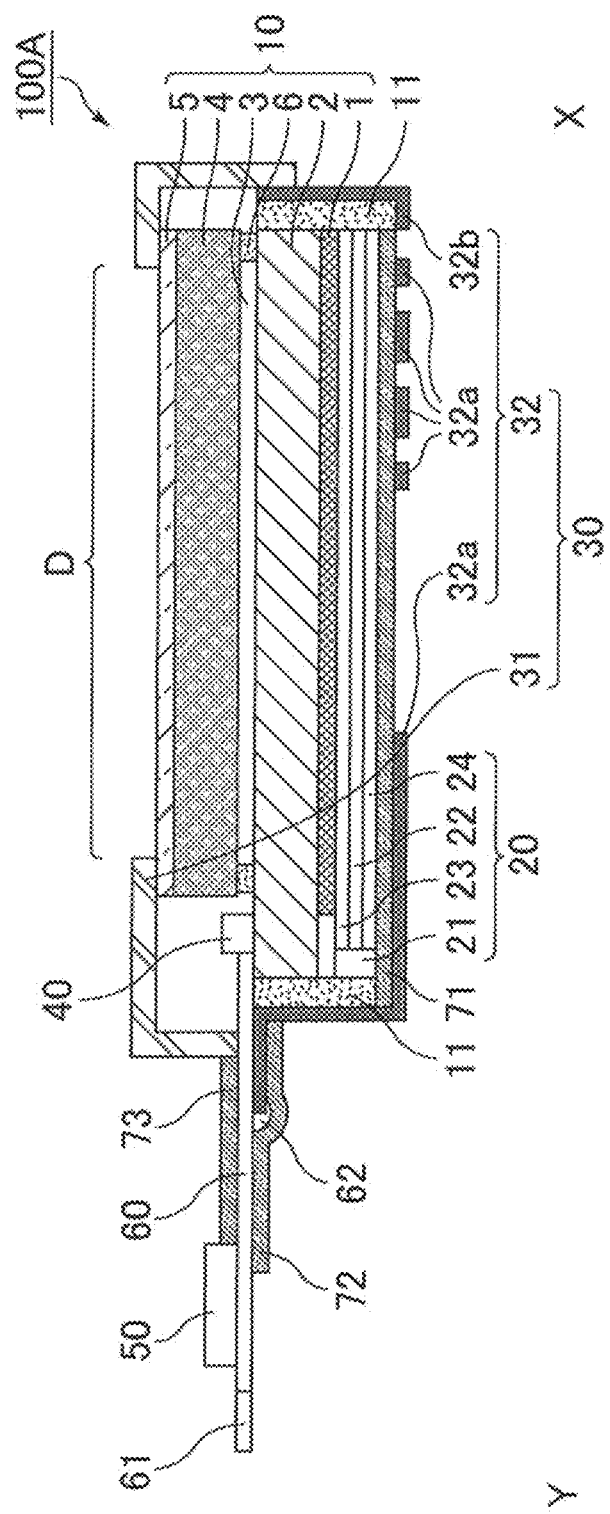
FIG. 1 is a cross-sectional view of a liquid crystal display device including an antenna coil according to Embodiment 1.
Figure 2:
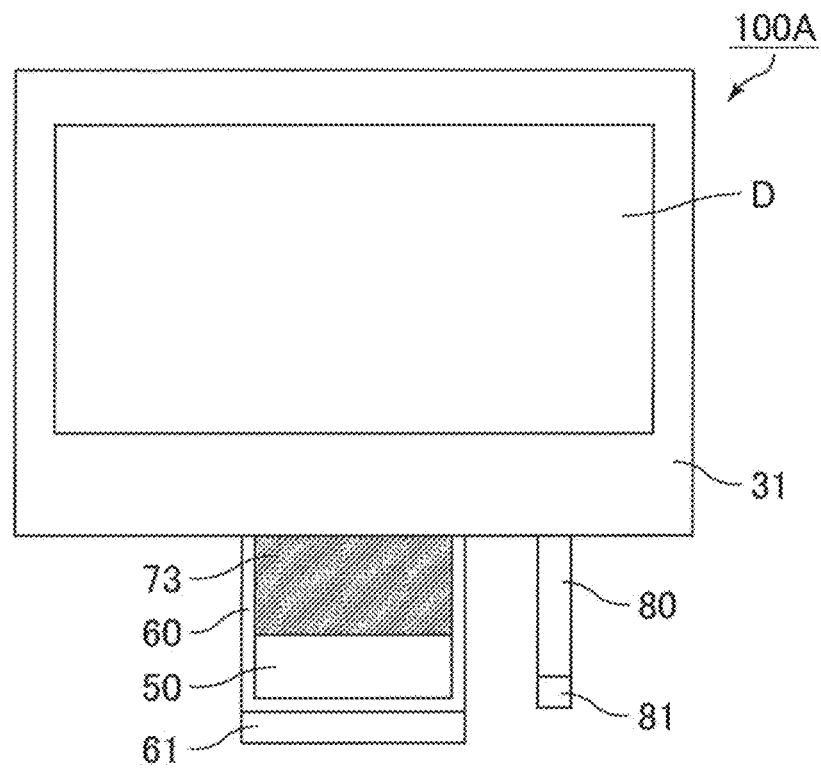
FIG. 2 is a front view of the liquid crystal display device shown in FIG. 1.
Figure 3:
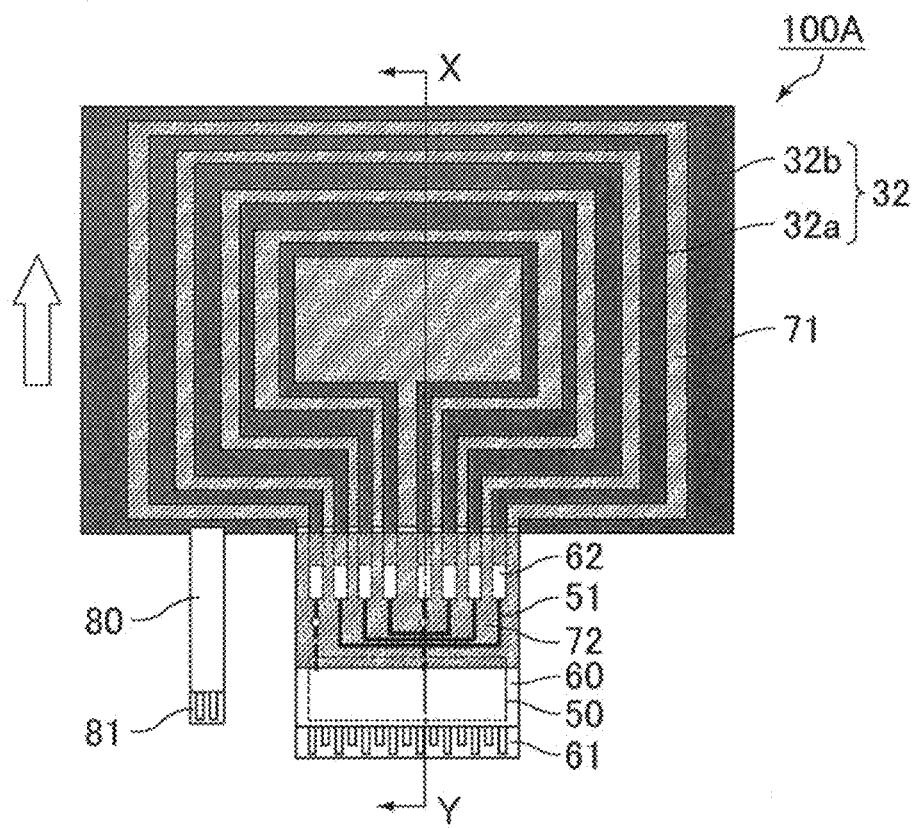
FIG. 3 is a rear view of the liquid crystal display device shown in FIG. 1.
Figure 4:
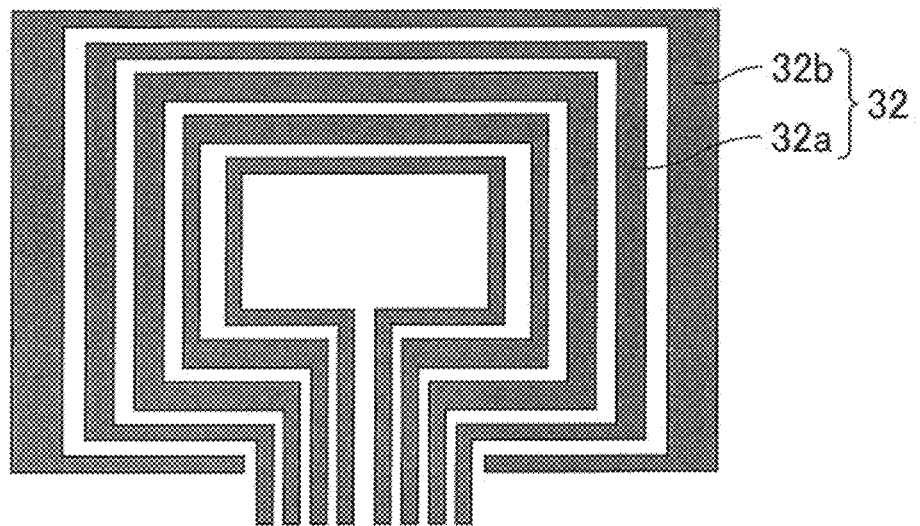
FIG. 4 is a plan view of a rear bezel used in the liquid crystal display device shown in FIG. 1.

A liquid crystal display device including an antenna coil according to Embodiment 1 is described below with reference to FIGS. 1 to 4. FIG. 1 is a cross-sectional view of the liquid crystal display device including an antenna coil according to Embodiment 1. FIG. 2 is a front view of the liquid crystal display device shown in FIG. 1. FIG. 3 is a rear view of the liquid crystal display device shown in FIG. 1. FIG. 1 is a cross-sectional view taken along the line X-Y in FIG. 3. FIG. 4 is a plan view of a rear bezel used in the liquid crystal display device shown in FIG. 1.

As shown in FIG. 1, a liquid crystal display device 100A including an antenna coil according to Embodiment 1 includes a liquid crystal panel (display element) 10, a backlight 20, and a bezel 30.

The liquid crystal panel 10 may be any one usually used in the field of liquid crystal display devices. The liquid crystal panel 10 has a structure in which, for example, a polarizing plate 1, a TFT substrate 2, a liquid crystal layer 3 containing liquid crystal molecules, a CF substrate 4, and a polarizing plate 5 are stacked in the given order. The liquid crystal layer 3 is sealed by a sealant 6 that bonds the TFT substrate 2 and the CF substrate 4 to each other. On the TFT substrate 2 is disposed a driver 40 that drives the liquid crystal panel 10.

The backlight 20 may be any one usually used in the field of liquid crystal display devices. The backlight 20 has a structure including, for example, a light source 21, a light guide plate 22 facing the light source 21, a diffusion sheet 23 disposed on the liquid crystal panel 10 side of the light guide plate 22, and a reflective sheet 24 disposed on the rear bezel 32 side of the light guide plate 22. Although Embodiment 1 employs an edge-lit backlight, a direct-lit backlight may also be used. The backlight 20 is connected to a flexible circuit board 80 on which a control circuit that controls driving of the backlight 20 is mounted. The flexible circuit board 80 has at its edge a terminal 81 connectable to an external circuit.

The bezel 30 includes a front bezel 31 disposed on the liquid crystal panel 10 side (front side) and provided with an opening superposed on a display region D of the liquid crystal panel 10, and a rear bezel 32 disposed on the backlight 20 side (rear side). The display region D is the region of the liquid crystal display device 100A where images are displayed and pixels of the liquid crystal panel 10 are arranged. The liquid crystal panel 10 and the backlight 20 are housed in the bezel 30, and are held by the front bezel 31 and the rear bezel 32.

The rear bezel 32 functions to support the liquid crystal panel 10 and the backlight 20 from the rear side. The rear bezel 32 can prevent leakage of light from the backlight 20 to the rear side of the liquid crystal display device 100A. In the case where the rear bezel 32 is a light reflective one, the rear bezel 32 can reflect light from the backlight 20 to the liquid crystal panel 10 side (front side) to increase the light use efficiency. As shown in FIGS. 3 and 4, the rear bezel 32 includes an antenna coil 32a formed from a conductive material and an outer edge 32b positioned outside the antenna coil 32a in a plan view. The antenna coil 32a and the outer edge 32b constituting the rear bezel 32 can be formed from the same conductive material. Yet, the antenna coil 32a and the outer edge 32b are electrically insulated from each other, and may be physically separated from each other. The antenna coil 32a functions as an antenna for a system such as near field communication (NFC). The outer edge 32b holds the edge of the backlight 20, is coupled with the front bezel 31, and surrounds the backlight 20 in a plan view.

The antenna coil 32a includes at least one, preferably two or more, substantially circular conductive line(s) surrounding the center of the coil. In FIG. 4, four substantially circular conductive lines surround the center of the coil, and the number of turns in the coil is four. Supplying current to the antenna coil 32a can generate a magnetic field, making the antenna coil 32a function as an antenna for a system such as NFC. Specifically, supplying current in the direction indicated by the white arrow in FIG. 3 generates a magnetic field from the front side to the rear side of the liquid crystal display device 100A, enabling communication with an external device on the rear side of the liquid crystal display device 100A.

As shown in FIGS. 3 and 4, in a plan view, each conductive line constituting the antenna coil 32a is disposed in a substantially quadrilateral pattern, and includes an extension part that is bent by 90° at intermediate points on the flexible circuit board (FPC) 60 side and extends toward the flexible circuit board 60. Also, as shown in FIG. 1, in a cross-sectional view, the extension part of each conductive line constituting the antenna coil 32a is bent by 90° twice such that the conductive line can be easily connected to the FPC 60. Yet, the extension part may be disposed in any pattern that enables the conductive line to be connected to the FPC 60, and the bending angle and the number of bends are not limited. Both ends of each conductive line are communicated with a conductive line 51 in the FPC 60. Each conductive line forms a ring when connected to the conductive line 51 in the FPC 60. In other words, the antenna coil 32a is formed into a coil by being connected to the conductive line 51 in the FPC 60.

The conductive material constituting the antenna coil 32a is preferably a metal with high conductivity, such as aluminum, copper, or an alloy thereof.

Part of the rear bezel is made to function as an antenna coil. This eliminates the need for an antenna coil in parts such as a PWB or a film, enabling reduction in the number of parts used. Here, the structure in which the antenna coil is to be disposed on the rear side of the liquid crystal panel 10 allows the antenna coil to be disposed at any position in the rear bezel without avoiding a region superposed on the display region, which means that there are fewer restrictions on the position of the antenna coil. Also, the structure in which the antenna coil is to be disposed on the rear side of the liquid crystal panel 10 eliminates the need for forming the antenna coil from a transparent electrode such as ITO, which means that there are no restrictions on materials.

The antenna coil 32a is electrically insulated from the front bezel 31 and the outer edge 32b of the rear bezel. When the antenna coil 32a is electrically connected to parts disposed near the outer edge 32b of the rear bezel or the front bezel 31, for example, magnetic fields generated in the antenna coil 32a cannot be appropriately controlled.

At least one of the outer edge 32b of the rear bezel or the front bezel 31 is preferably a conductor. At least one of these conductors, namely the outer edge 32b of the rear bezel or the front bezel 31, is connected to the ground (GND), and thus can protect the liquid crystal panel 10 from electrostatic discharge (ESD), for example. For simultaneous formation of the antenna coil 32a and the outer edge 32b, both the antenna coil 32a and the outer edge 32b are preferably conductors. The antenna coil 32a and the front bezel 31 can be electrically insulated from each other by, for example, forming the front bezel 31 from an insulating material such as a resin or disposing an insulating material such as a resin between the front bezel 31 and the antenna coil 32a. In order to electrically insulating the antenna coil 32a and the outer edge 32b from each other, the antenna coil 32a and the outer edge 32b are preferably disposed such that they do not come into contact with each other.

The antenna coil 32a is also preferably electrically insulated from the liquid crystal panel 10. The TFT substrate 2 constituting the liquid crystal panel 10 includes many metal parts such as conductive lines. Thus, in FIG. 1, the TFT substrate 2 is surrounded by a resin frame 11 such that the TFT substrate 2 is prevented from being electrically connected to the antenna coil 32a.

The antenna coil 32a may be bonded to the rear surface of the backlight 20. The antenna coil 32a is preferably bonded to the rearmost part among the parts constituting the backlight 20. Bonding the antenna coil 32a to the backlight 20 can reduce deflection of sheets such as the diffusion sheet 23 and the reflective sheet 24 constituting the backlight 20. The antenna coil 32a and the backlight 20 can be bonded to each other by any method such as attaching pressure-sensitive adhesive tape to the antenna coil 32a or the backlight 20 or coating the antenna coil 32a or the backlight 20 with an adhesive. The pressure-sensitive adhesive tape preferably has a smaller width than the antenna coil 32a.

The outer edge 32b is preferably formed from the same material as the antenna coil 32a. Forming the outer edge 32b and the antenna coil 32a from the same material enables simultaneous formation of the outer edge 32b and the antenna coil 32a.

The outer edge 32b and the antenna coil 32a are simultaneously formed by, for example, cutting out the outer edge 32b and the antenna coil 32a from a metal plate using dies. For example, a method may be used which includes, in production of the liquid crystal display device 100A, cutting out antenna pieces of the antenna coil 32a coupled together at some sites and the antenna coil 32a and the outer edge 32b coupled together at some sites so as to prevent the antenna coil 32a from coming to pieces, and separating them at the coupled sites in the final process where the rear bezel 32 is produced.

The front bezel 31 can be formed from an insulating material such as a resin or a metal such as aluminum, for example. In the case of using a metal, an insulating material is preferably disposed between the front bezel 31 and the antenna coil 32a such that the front bezel 31 and the antenna coil 32a do not come into contact with each other.

The liquid crystal display device 100A including an antenna coil according to Embodiment 1 further includes the flexible circuit board 60 on which an antenna control circuit 50 that controls the antenna coil. 32a is mounted. The conductive lines of the antenna coil 32a extend on the flexible circuit board 60 and are connected to the respective conductive lines 51 leading to the antenna control circuit 50 on the flexible circuit board 60. The antenna coil 32a and the flexible circuit board 60 are connected to each other by conductive connectors 62 such as solder or conductive tape. This structure allows the antenna coil 32a and the conductive lines 51 to connect to each other. On the flexible circuit board 60 may be mounted control circuit(s) other than the antenna control circuit 50. The flexible circuit board 60 has at its edge a terminal 61 connectable to an external circuit.

The liquid crystal display device 100A including an antenna coil according to Embodiment 1 includes magnetic sheets 71, 72, and 73. Supplying current to the antenna coil 32a generates a magnetic field. However, if a metal part is present near the antenna coil 32a, the magnetic field may generate an eddy current in the metal part when passing through the metal part. The eddy current generates a magnetic field that may disturb the magnetic field generated from the antenna coil 32a to interrupt the communication. Thus, disposing the magnetic sheet 71 between the backlight 20 and the antenna coil 32a can artificially keep the antenna coil 32a away from the metal part present on the backlight 20 side. This enhances the communication performance of the antenna coil 32a, facilitating communication from the rear side of the liquid crystal display device 100A.

For enhancement of the communication performance of the antenna coil 32a, the magnetic sheet 72 may be disposed on the front side of the flexible circuit board 60 and the magnetic sheet 73 may be disposed on the rear side of the flexible circuit board 60. With at least one of the magnetic sheets 72 and 73, the magnetic sheet(s) can be disposed to be superposed on the entire coil including the antenna coil 32a and the conductive lines 51 in a plan view. Also, a magnetic sheet may be disposed on an inner side surface of the rear bezel 32.

Examples of the magnetic sheets 71, 72, and 73 include those containing a non-conductive magnetic substance such as ferrite. Sheet-shaped products obtained by mixing the magnetic substance and a resin, for example, can be used as the magnetic sheets 71, 72, and 73. Although known magnetic sheets are usually black ones, the magnetic sheet 71 to be disposed between the backlight 20 and the antenna coil 32a is one having a gray, white, or any other color with a higher luminance than a black one. Such a magnetic sheet can reflect light leaking from the backlight 20 to the rear side to the front side of the liquid crystal display device 100A, increasing the luminance of the liquid crystal display device 100A.

The antenna coil 32a may be bonded to the rear surface of the magnetic sheet 71 between the backlight 20 and the antenna coil 32a. The antenna coil 32a and the magnetic sheet 71 may be bonded to each other by any method such as attaching pressure-sensitive adhesive tape to the antenna coil 32a or the magnetic sheet 71 or coating the antenna coil 32a or the magnetic sheet 71 with an adhesive. The pressure-sensitive adhesive tape preferably has a smaller width than the antenna coil 32a. The magnetic sheets 72 and 73 may be bonded to the flexible circuit board 60.

The liquid crystal display device 100A including an antenna coil according to Embodiment 1 may be included in another device. For example, the liquid crystal display device 100A may function as a display of a terminal including a point of sales (POS) system (hereinafter, such a terminal is also referred to as a POS terminal). The exterior part of the POS terminal is preferably a resin-molded part. This is because if the exterior part of the POS terminal is-made of a metal, the exterior part may interrupt communication of the liquid crystal display device 100A including an antenna coil.

Modified Example

Figure 5:
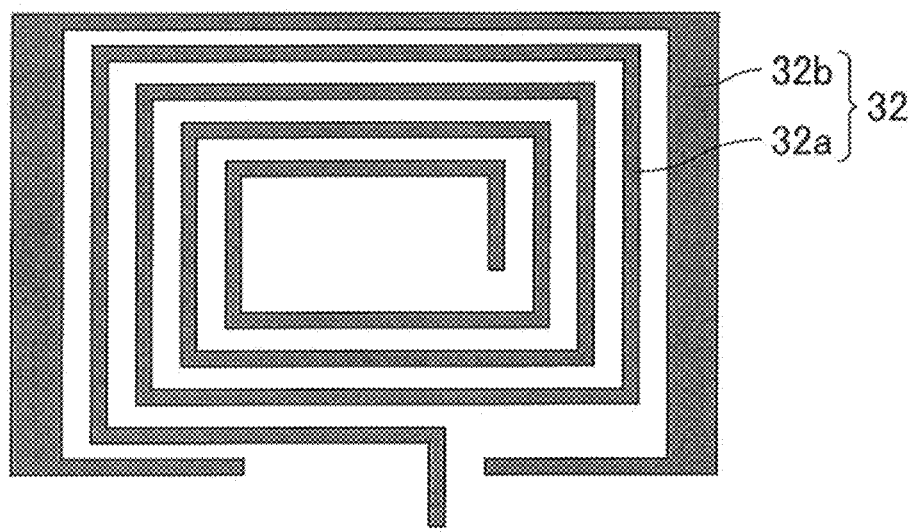
FIG. 5 is a plan view of a rear bezel according to a modified example.

The rear bezel 32 may have a shape other than the shape shown in FIG. 4, and may have a shape shown in FIG. 5, for example. FIG. 5 is a plan view of a rear bezel according to a modified example. The rear bezel 32 shown in FIG. 5 includes the antenna coil 32a formed by spirally winding one continuous conductive line. Since the coil consists of one conductive line, there are only two sites connected to the flexible circuit board 60. The antenna coil 32a having the shape shown in FIG. 5 is therefore more advantageous in connection to the flexible circuit board 60 than the antenna coil 32a having the shape shown in FIG. 4.

Figure 6:
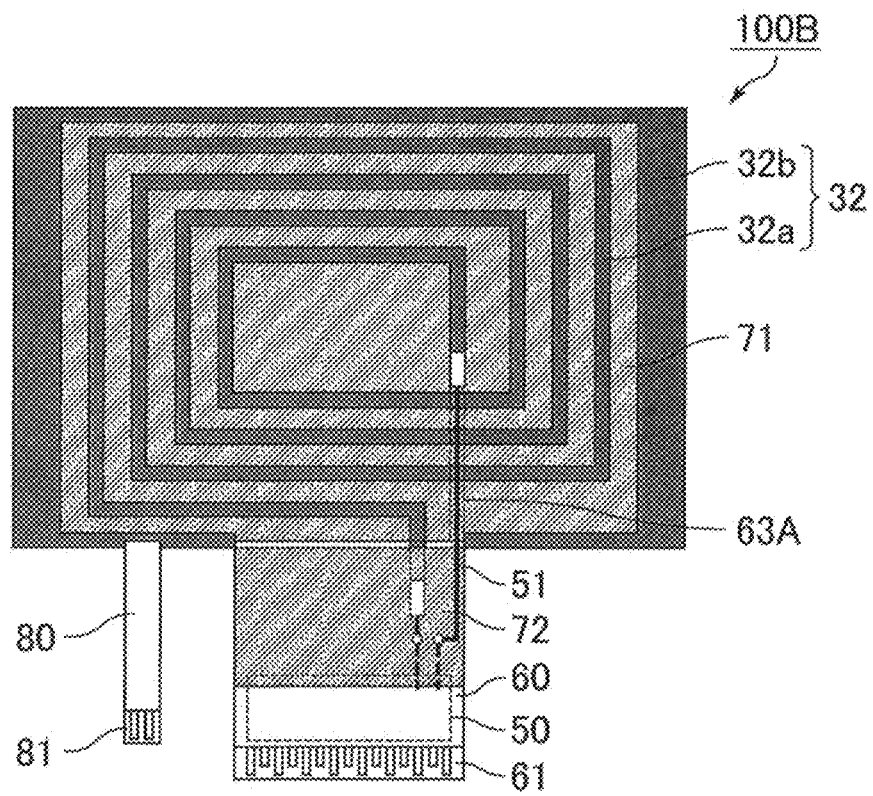
FIG. 6 is a rear view of an exemplary liquid crystal display device utilizing the antennal coil shown in FIG. 5.
Figure 7:
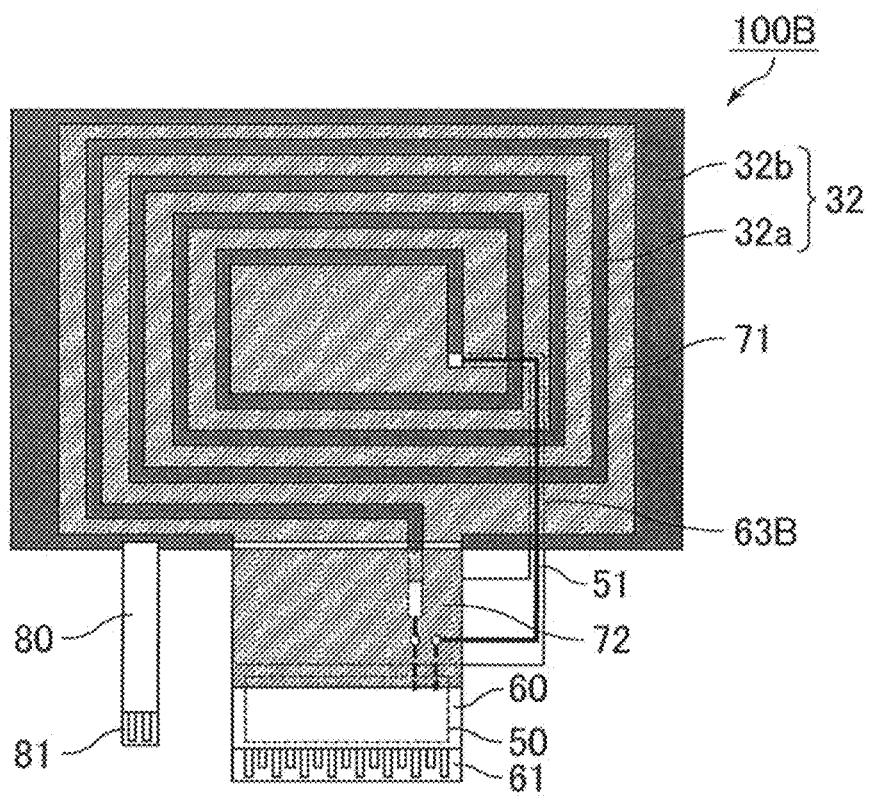
FIG. 7 is a rear view of another exemplary liquid crystal display device utilizing the antenna coil shown in FIG. 5.

The antenna coil 32a shown in FIG. 5 and the flexible circuit board 60 may be connected in any state, such as in the state shown in FIG. 6 or 7. FIG. 6 is a rear view of an exemplary liquid crystal display device utilizing the antennal coil shown in FIG. 5. The flexible circuit board 60 shown in FIG. 6 includes an extension part 63A connected to an end of the one continuous conductive line constituting the antenna coil 32a. FIG. 7 is a rear view of another exemplary liquid crystal display device utilizing the antenna coil shown in FIG. 5. The flexible circuit board 60 shown in FIG. 7 includes an extension part 63B connected to an end of the one continuous conductive line constituting the antenna coil 32a.

For connection of the flexible circuit board 60 to an end of the one continuous conductive line constituting the antenna coil 32a, the flexible circuit board 80 on which a control circuit that controls driving of the backlight 20 is mounted may also be used. In this case, since the antenna control circuit 50 is mounted on the flexible circuit board 60, one end of the flexible circuit board 80 is connected to an end of the conductive line while the other end of the flexible circuit board 80 is connected to the flexible circuit board 60.

What is claimed is:

1. A liquid crystal display device including an antenna coil, the device comprising:
   a liquid crystal panel;
   a backlight; and
   a bezel,
   the bezel including a front bezel and a rear bezel and housing the liquid crystal panel and the backlight using the front bezel and the rear bezel in combination, the front bezel disposed on a liquid crystal panel side and provided with an opening superposed on a display region of the liquid crystal panel, the rear bezel disposed on a backlight side,
   the rear bezel including an antenna coil formed from a conductive material and an outer edge positioned outside the antenna coil in a plan view,
   the antenna coil electrically insulated from the front bezel and the outer edge of the rear bezel.

2. The liquid crystal display device including an antenna coil according to claim 1, further comprising a flexible circuit board on which an antenna control circuit configured to control the antenna coil is mounted,
   wherein the antenna coil is connected to the antenna control circuit on the flexible circuit board.

3. The liquid crystal display device including an antenna coil according to claim 1,
   wherein the antenna coil is bonded to a rear surface of the backlight.

4. The liquid crystal display device including an antenna coil according to claim 1, further comprising a magnetic sheet between the backlight and the antenna coil.

5. The liquid crystal display device including an antenna coil according to claim 4,
   wherein the antenna coil is bonded to a rear surface of the magnetic sheet.

* * * * *